US008401592B2

(12) United States Patent
Roh et al.

(10) Patent No.: US 8,401,592 B2
(45) Date of Patent: Mar. 19, 2013

(54) MOBILE TERMINAL HAVING STORAGE BOX AND SAVING METHOD THEREOF

(75) Inventors: Byung-Nam Roh, Gyeonggi-do (KR); Jeong-Hyuk Yoon, Seoul (KR); Young-Suk Oh, Seoul (KR); Hyo-Jin Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/246,460

(22) Filed: Oct. 6, 2008

(65) Prior Publication Data

US 2009/0098910 A1 Apr. 16, 2009

(30) Foreign Application Priority Data

Oct. 5, 2007 (KR) .................. 10-2007-0100566

(51) Int. Cl.
*H04M 1/00* (2006.01)
*H04B 1/38* (2006.01)

(52) U.S. Cl. ........................................ 455/566

(58) Field of Classification Search .......... 455/566, 455/550.1, 90.1–90.3, 556.2, 557, 414.1; 379/93.19
See application file for complete search history.

(56) References Cited

U.S. PATENT DOCUMENTS

| 6,545,669 | B1 | 4/2003 | Kinani et al. |
| 6,590,568 | B1 | 7/2003 | Astala et al. |
| 6,611,836 | B2 * | 8/2003 | Davis et al. .................. 1/1 |
| 7,895,533 | B2 * | 2/2011 | Fagans ..................... 715/838 |

FOREIGN PATENT DOCUMENTS

| CN | 1885985 | 12/2006 |
| EP | 1739533 | 1/2007 |

* cited by examiner

*Primary Examiner* — Eugene Yun
(74) *Attorney, Agent, or Firm* — Lee, Hong, Degerman, Kang & Waimey

(57) ABSTRACT

A mobile terminal having a touch function is presented. The mobile terminal includes a display unit to display one or more content on a screen and a storage box positioned on the screen for storing at least one of the one or more content dragged on the screen.

12 Claims, 9 Drawing Sheets

MOBILE TERMINAL HAVING STORAGE BOX AND SAVING METHOD THEREOF

CROSS-REFERENCE TO RELATED APPLICATIONS

Pursuant to 35 U.S.C. §119(a), this application claims the benefit of earlier filing date and right of priority to Korean Application No. 10-2007-0100566 filed in Korea on Oct. 5, 2007, the entire contents of which is hereby incorporated by reference in its entirety.

BACKGROUND OF THE INVENTION

1. Field of the Invention

The present invention relates to mobile terminal including a content box for storing information for multi-tasking.

2. Discussion of the Related Art

A mobile terminal is a device that may be easily transported and may perform one or more functions such as voice and video communications, input and output of information, and storing data.

As such functions become more diversified, the mobile terminal may support more complicated functions such as capturing images or video, reproducing music or video files, playing games, and receiving broadcast signals. By comprehensively and collectively implementing such functions, the mobile terminal may be embodied as a multimedia device.

In order to implement various functions of such multimedia players or devices, the mobile terminal requires sufficient hardware or software support. For example, a user interface environment is provided to allow users to easily and conveniently search or select functions.

The user of a mobile terminal may access various types of information via the mobile terminal as the functions of mobile terminals are diversified and mobile terminals are implemented as comprehensive multimedia players. For example, a user may access various forms of content via the Internet. The user may store a portion or the entirety of the content, such as a screen image, text, or a URL.

However, the user must store the corresponding content individually in a respective storage space if the user elects to store the portion or the entirety of the content. Thus, the storage process is often cumbersome. Additionally, when the user wants to use the corresponding data for an MMS (Multimedia Messaging Service) or an e-mail, the user must search each storage area.

Thus, a mobile terminal may provide greater convenience to a user in terms of searching and using information if a portion of the entirety of certain contents and screen images could be stored in a single storage space regardless of the types of the contents or images.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a mobile terminal having a touch function is presented. The mobile terminal includes a display unit to display one or more content on a screen, and a storage box positioned on the screen for storing at least one of the one or more content dragged on the screen.

In one feature, the screen of the display unit is a touch screen, the storage box is positioned at one end of the screen, and the one end portion refers to a lower end portion of the display unit. Additionally, the storage box comprises a region with a pre-determined size and shape and the number of stored content is visually displayed on the storage box. Furthermore, contents are drag-and-dropped to the region of the storage box for storage. Moreover, the storage box is constantly displayed on the display unit.

In another feature, the storage box is temporarily displayed when a particular region is selected on the screen.

In yet another feature, the storage box comprises a linear shape and the content is stored in the storage box via dragging the content over a line corresponding to the storage box.

In still yet another feature, the stored content is displayed on the screen if the storage box is selected.

In another embodiment, a method for storing information in a mobile terminal having a touch function is presented. The method includes displaying content information on a screen, storing content information dragged on the screen in a storage box displayed in the screen, and selectively using the stored content information for an application.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
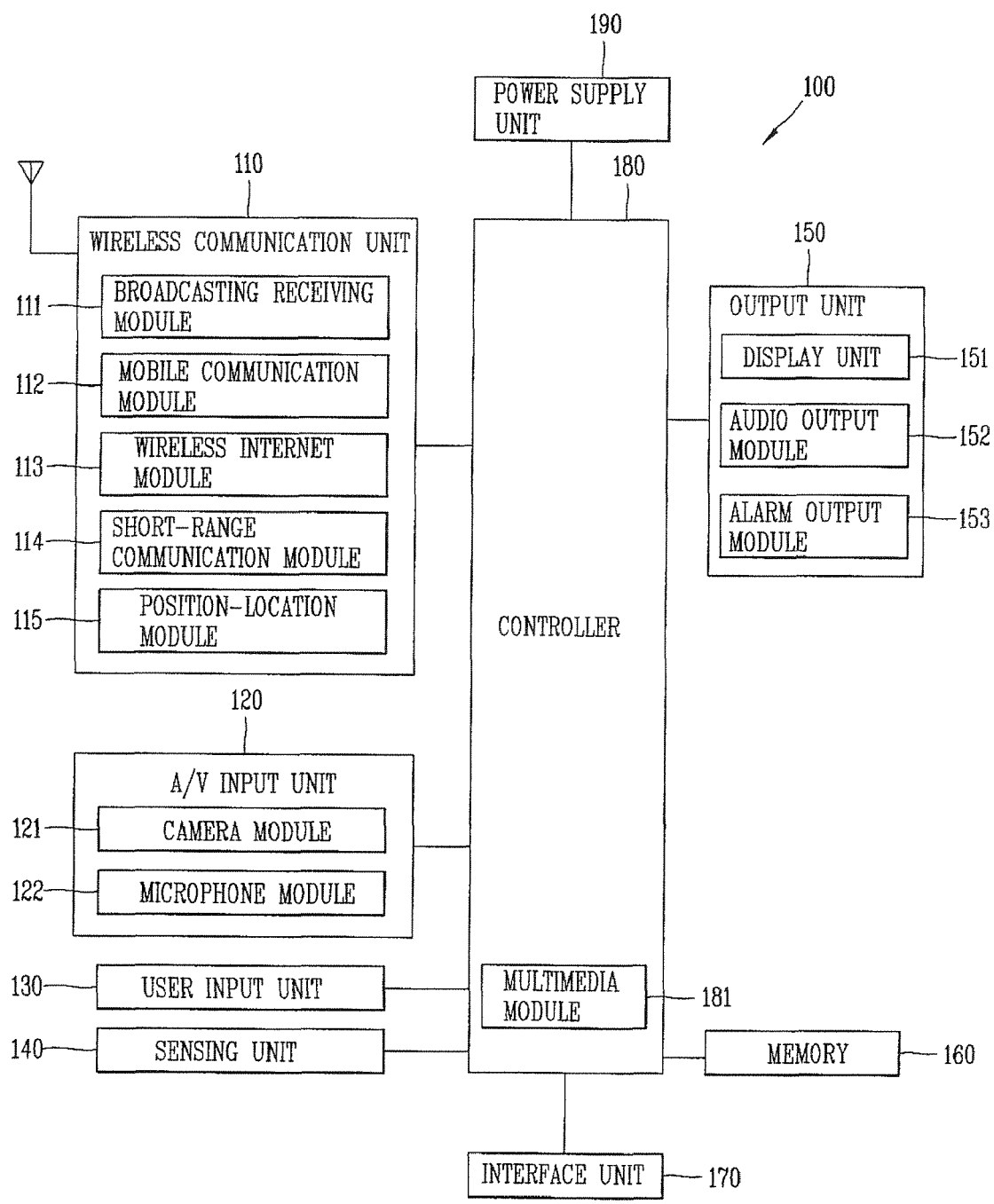
FIG. 1 is a schematic block diagram of a mobile terminal according to an embodiment of the present invention.

FIG. 1 is a block diagram of terminal 100 in accordance with an embodiment of the present invention. The terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 illustrates the terminal 100 having various components, but it is understood that implementing all of the illustrated components is not a requirement. Greater or fewer components may alternatively be implemented.

The mobile terminal 100 illustrated in FIG. 1 includes a wireless communication unit 110, an A/V (Audio/Video) input unit 120, a manipulation unit 130, a sensing unit 140, an output unit 150, a storage unit 160, an interface unit 170, a controller 180, and a power supply unit 190. Greater or fewer components may alternatively be implemented.

The wireless communication unit 110 may include a broadcast receiving module 111, a mobile communication module 112, a wireless Internet module 113, a short-range communication module 114, and a position-location module 115.

The broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

The broadcast associated information may be provided via a mobile communication network, such as 3GPP, 3GPP2, IEEE, CDMA, GSM, OMA, and 4G techniques. Additionally, the broadcast associated information may be received by the mobile communication module 112.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). The broadcast receiving module 111 is configured to be suitable for every broadcast system that provides a broadcast signal as well as the above-mentioned digital broadcast systems.

The broadcast receiving module 111 may also receive multicast signals. Data received by the broadcast receiving module 111 may be stored in a suitable device, such as the memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal 100. The wireless Internet module 113 may be internally or externally coupled to the terminal 100.

The short-range communication module 114 facilitates short-range communications. Suitable technologies for implementing the short-range communications module 114 include radio frequency identification (RFID), infrared data association (IrDA), ultra-wideband (UWB), as well at the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components Data generated by the A/V input unit 120 may be stored in the memory 160, utilized by the output unit 150, or transmitted via one or more modules of communication unit 110. The terminal 100 may include two or more microphones 122 or cameras 121.

The user input unit 130 generates input data in response to user manipulation of an associated input device or devices. Examples of such devices include a keypad, a dome switch, a touchpad, a jog wheel, and a jog switch. Additionally, the touchpad may function as a touch screen if the touch pad is overlaid on the display unit 151 in a layered manner.

The sensing unit 140 provides status measurements for various aspects of the terminal 100. For example, the sensing unit may detect an open and close state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired and wireless headphones, external chargers, power supplies, storage devices configured to store data, or microphones. The interface unit 170 may be configured using a wired and wireless data port, a memory card socket, audio input and output ports (I/O), or video I/O ports.

The interface unit 170 may be used to receive inputs (e.g., data, information, power, etc.) from an external device and transfer the received inputs to one or more elements within the mobile terminal 100 or may be used to transfer data between the mobile terminal and an external device.

The interface unit 170 may act as a passage for supplying the mobile terminal 100 with a power from the cradle or delivering various command signals input from the cradle if the mobile terminal 110 is connected to an external cradle. Each of the various command signals input from the cradle or the power may operate as a signal enabling the mobile terminal 100 to recognize that it is correctly loaded in the cradle.

The output unit 150 outputs information associated with the terminal 100. The display unit 151 is typically implemented to display information associated with the terminal 100. For example, the display unit 151 may provide a graphical user interface which includes information associated with a phone call if the terminal is operating in a phone call mode. The display unit 151 may display images which are associated with various modes, such as a video call mode or a photographing mode.

The display unit 151 may be configured as a touch screen working in cooperation with the user input unit 130, in one embodiment of the present invention. This configuration allows the display unit 151 to function both as an output device and an input device.

The display unit 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more displays 15. An example of a two-display embodiment is one in which one display unit 151 is configured as an internal display which is viewable when the terminal 100 is in an opened position and a second display configured as an external display which is viewable in both the open and closed positions.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio relating to a particular function, such as a call notification, a message notification, or a error notification.

The output unit 150 is further shown having an alarm module 153, which may be used to identify the occurrence of an event associated with the terminal 100. An example an output of alarm module 153 includes a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

The memory 160 may store various types of data to support the processing, control, or storage requirements of the terminal 100. Examples of such data include program instructions for applications operating on the terminal, contact data, phonebook data, messages, pictures, or video.

The memory 160 shown in FIG. 1 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal 100. For example, the controller 180 performs the control and processing associated with voice calls, data communications, video calls, camera operations, and recording operations.

The controller 180 may include a multimedia module 181 which provides multimedia playback. The multimedia module 181 may be configured as part of the controller 180 or may be implemented as a separate component.

Moreover, the controller 180 is able to perform a pattern recognizing process for recognizing a writing input and a picture drawing input carried out on the touchscreen as characters or images.

The power supply 190 provides power to the various components of the terminal 100. The power provided may be internal power or external power.

Figure 2:
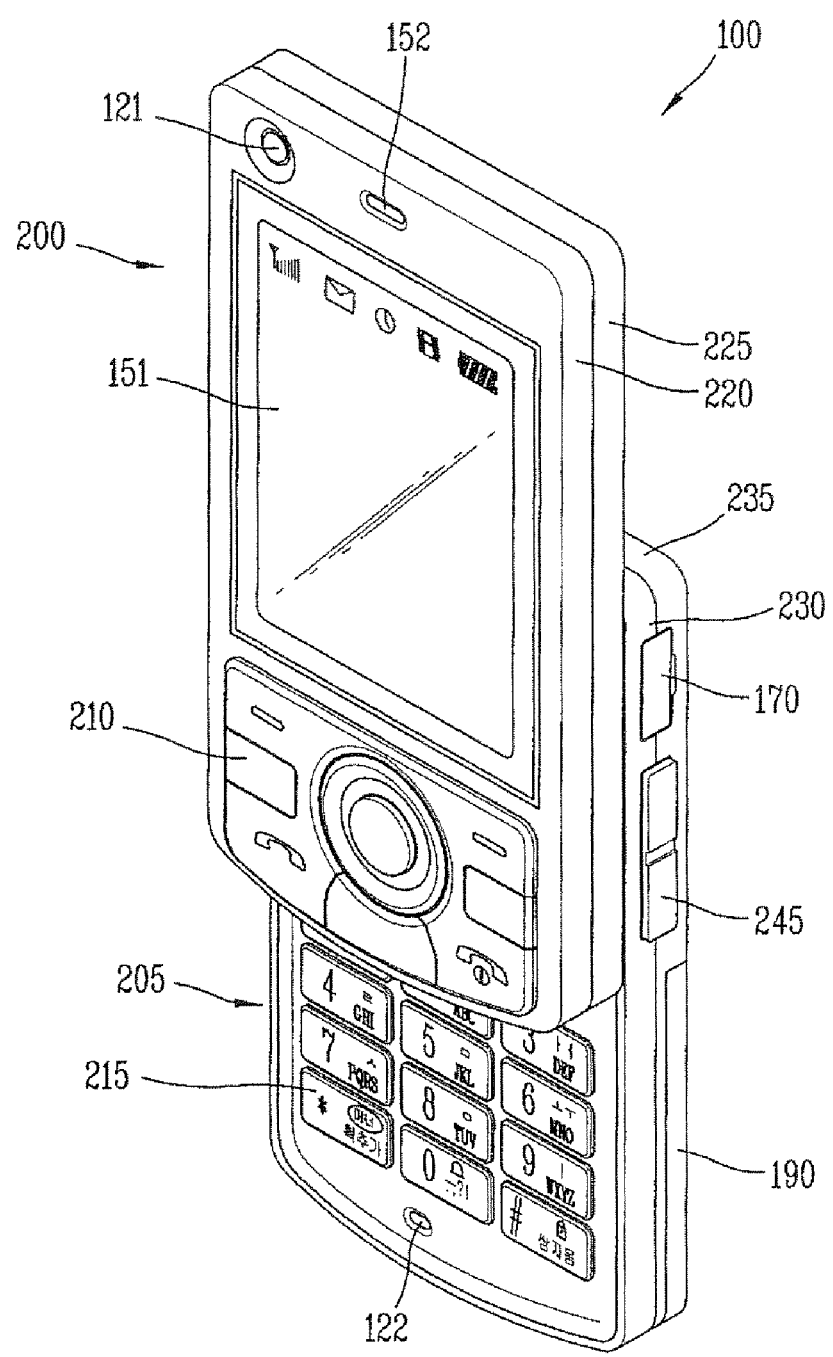
FIG. 2 is a front perspective view of the mobile terminal according to an embodiment of the present invention.

For clarity, further disclosure will primarily relate to a slide-type terminal 100. However such teachings apply equally to other types of terminals 100. FIG. 2 is a perspective view of a front side of a terminal 100 according to an embodiment of the present invention. As shown in FIG. 2, the terminal 100 is shown having a first body 200 configured to slideably cooperate with a second body 205.

The terminal 100 is operable in either a standby mode or an active call mode. Typically, the terminal 100 functions in the standby mode when in the closed position and in the active mode when in the open position. The mode configuration may be changed as required or desired by the user.

The first body 200 is shown formed from a first case 220 and a second case 225 and the second body 205 is shown formed from a first case 230 and a second case 235. The respective first 220, 230 and second 225, 235 cases may be formed from a suitably ridge material such, as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and the second body 205 may be sized to house electronic components necessary to support operation of the terminal 100.

The first body 200 is shown having a camera 121, a display unit 151, function keys 210, and audio output module 152. The camera 121 may be selectively positioned such that it may rotate or swivel relative to the first body 200.

The function keys 210 are positioned adjacent to a lower side of the display unit 151. The display unit 151 is shown implemented as an LCD. The display unit 151 may also be configured as a touchscreen having an underlying touchpad which generates signals responsive to user contact with the touchscreen. The touchscreen can be configured to detect a touch input pressure as well as a touch input position and size.

Additionally, a proximity sensor (not shown) may be provided within or around the touchscreen. The proximity sensor detects an object approaching a prescribed detecting surface or a presence or non-presence of an object near the proximity sensor using an electromagnetic power or infrared rays without mechanical contact.

Examples of the operational principle of the proximity sensor are explained as follows. First, an oscillation amplitude of the oscillation circuit attenuates or stops if an object approaches a sensor detecting surface while an oscillation circuit oscillates a sine radio frequency. This change is converted to an electric signal to detect a presence or non-presence of the object. Therefore, a proximity switch may detect any non-metallic object without interference.

Additionally, an electrostatic sensor may be configured to detect the proximity of a pointer via an electric field change attributed to the proximity of the pointer. The sensor may detect a position of the pointer and a distance between the pointer and the touchscreen if the pointer is placed in the vicinity of the touchscreen without actually contacting the touchscreen.

For clarity and convenience of explanation, an action for enabling the pointer approaching the touchscreen to be recognized as placed on the touchscreen is referred to as a 'proximity touch' and an action of enabling the pointer to actually come into contact with the touchscreen is referred to as a 'contact touch'. Additionally, a position at which the proximity touch is made to the touchscreen using the pointer is referred to as the position of the pointer vertically corresponding to the touchscreen when the pointer makes the proximity touch.

The second body 205 is shown having a microphone 122 positioned adjacent to the keypad 215 and side keys 245 positioned along the side. The side keys 245 may be configured as hot keys, such that the side keys are associated with a particular function of the terminal 100.

An interface unit 170 is shown positioned adjacent to the side keys 245. The interface unit 170 may be implemented as a connection port for connecting an earphone to the mobile terminal via a fixed or wireless means, a port for short-range communications, such as an Infrared Data Association (IrDA) port, a Bluetooth™ port, a wireless LAN port, or a power supply port for providing power to the mobile terminal. Additionally, the interface unit 170 may be a card socket for accommodating a SIM (Subscriber Identification Module) card or a UIM (User Identity Module) card, or an external card such as a memory card for storing information. A power supply 190 in a form of a battery is located on a lower portion of the second body 205.

Figure 3:
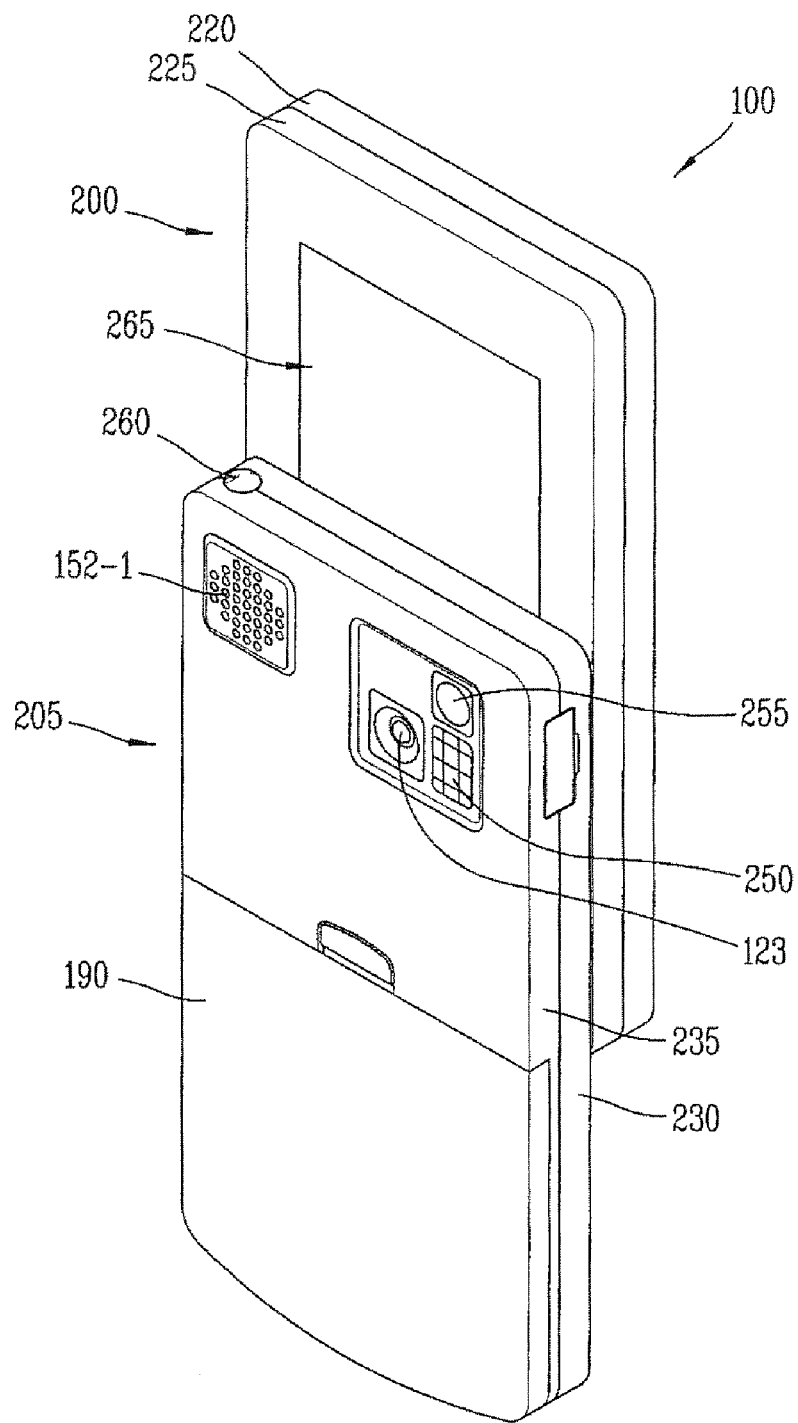
FIG. 3 is a rear view of the mobile terminal in FIG. 2.

FIG. 3 is a rear view of the terminal 100 shown in FIG. 2. As shown in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by the camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes a second audio output module 152-1 configured as a speaker which is located on an upper side of the second body. The audio output module 152 of the first body 200 and the second audio output module 152-1 of second body 205 may cooperate to provide stereo output. Moreover, either or both of the audio output module 152 and the second audio output module 152-1 may be configured to operate as a speakerphone.

A broadcast signal receiving antenna 260 is shown located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not shown) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those shown by the representative figures.

The terminal 100 may operate in a communication system capable of transmitting data via frames or packets. The communication system may include wired communication, wireless communication, or satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
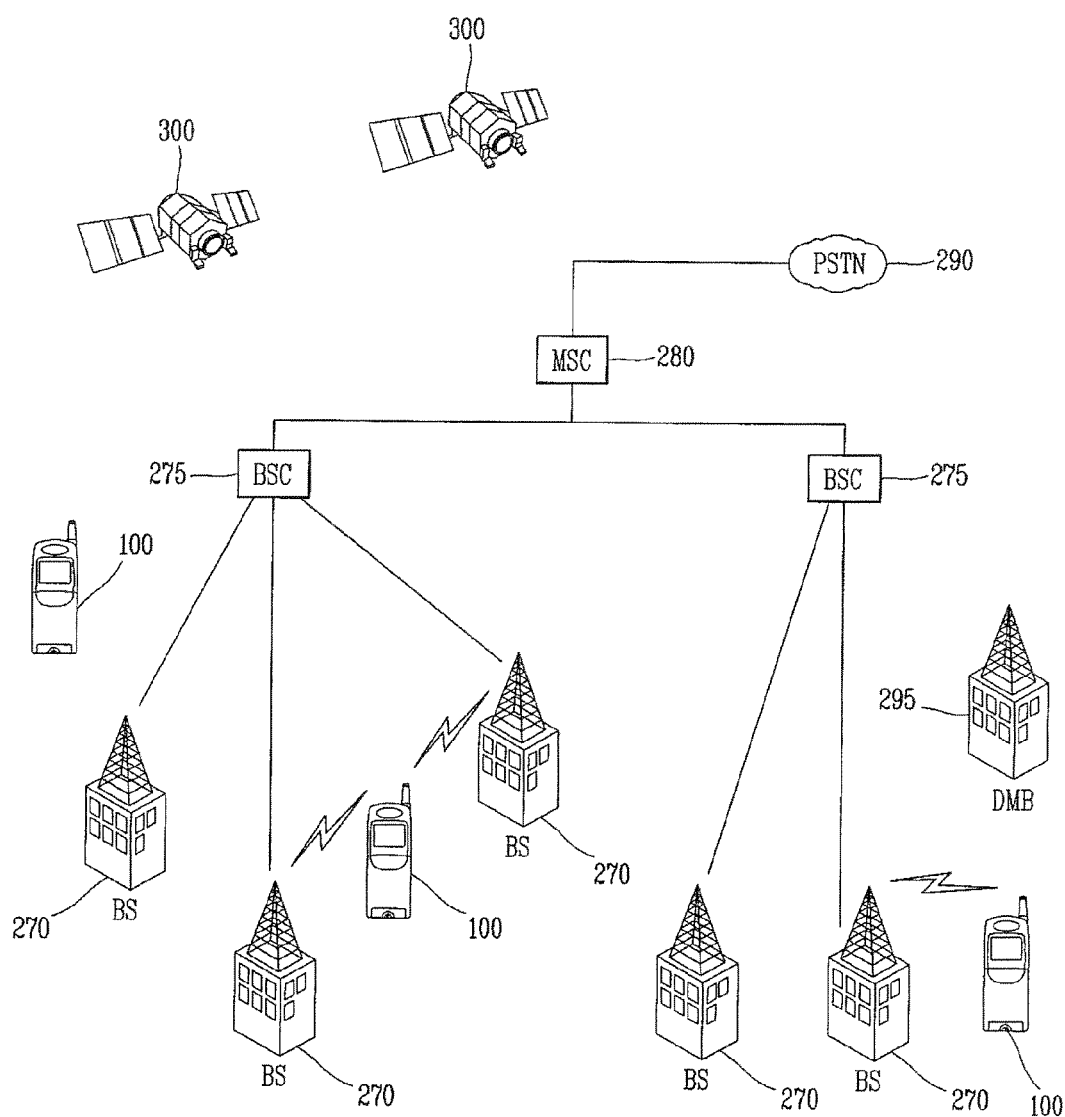
FIG. 4 is a block diagram of a wireless communication system operable with the mobile terminal according to an embodiment of the present invention.

As shown in FIG. 4, a CDMA wireless communication system is shown having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is shown broadcasting to terminals 100 operating within the system. The broadcast receiving module 111 of the terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275.

The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN interfaces with the MSC 280 and the MSC interfaces with the BSC 275, which in turn control the BSs 270 to transmit sets of forward-link signals to the terminals 100.

Figure 5:
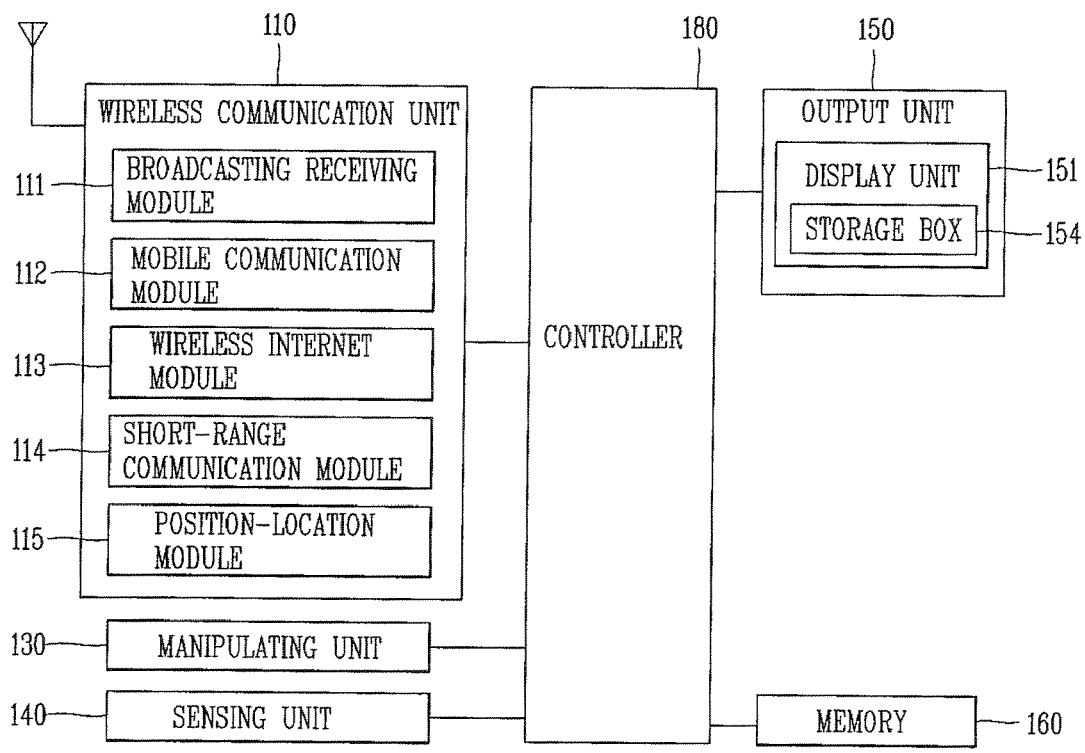
FIG. 5 illustrates the configuration of a mobile terminal having a storage box according to an embodiment of the present invention.

FIG. 5 illustrates the configuration of a mobile terminal having a storage box 154 according to an embodiment of the present invention. As illustrated in FIG. 5, the mobile terminal includes components similar to the components described above with respect to FIG. 1. Nevertheless, in addition the components described in FIG. 1, the mobile terminal 100 illustrated in FIG. 5 also includes a storage box 154.

As previously described, the display unit 151 displays information processed in the mobile terminal 100. For example, if the mobile terminal is in a phone call mode, the display unit 151 displays a UI (User Interface) or a GUI (Graphic User Interface) related to a call. As illustrated in FIG. 5, the display unit 151 may display a storage box 154 at one end portion of the display unit 151. The storage box 154 temporarily stores a portion or the entirety of the content displayed on the display unit 151.

Figure 6:
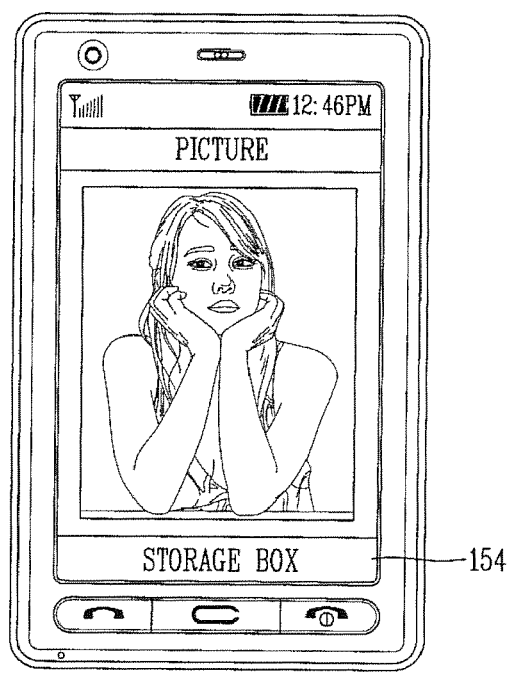
FIG. 6 illustrates one example of a storage box according to an embodiment of the present invention.

The storage box 154 of the mobile terminal and its storing operation according to the present invention will now be described in detail. FIG. 6 illustrates one example of a storage box according to an embodiment of the present invention. As illustrated in FIG. 6, the storage box 154 may be displayed at a specific region of the display unit 151.

For example, the storage unit 10 may be displayed at a lower portion of a touch screen of the display unit 151. The storage box 154 may be constantly displayed on the display unit 151 regardless of the content which is stored in the storage box 154.

Figure 7:
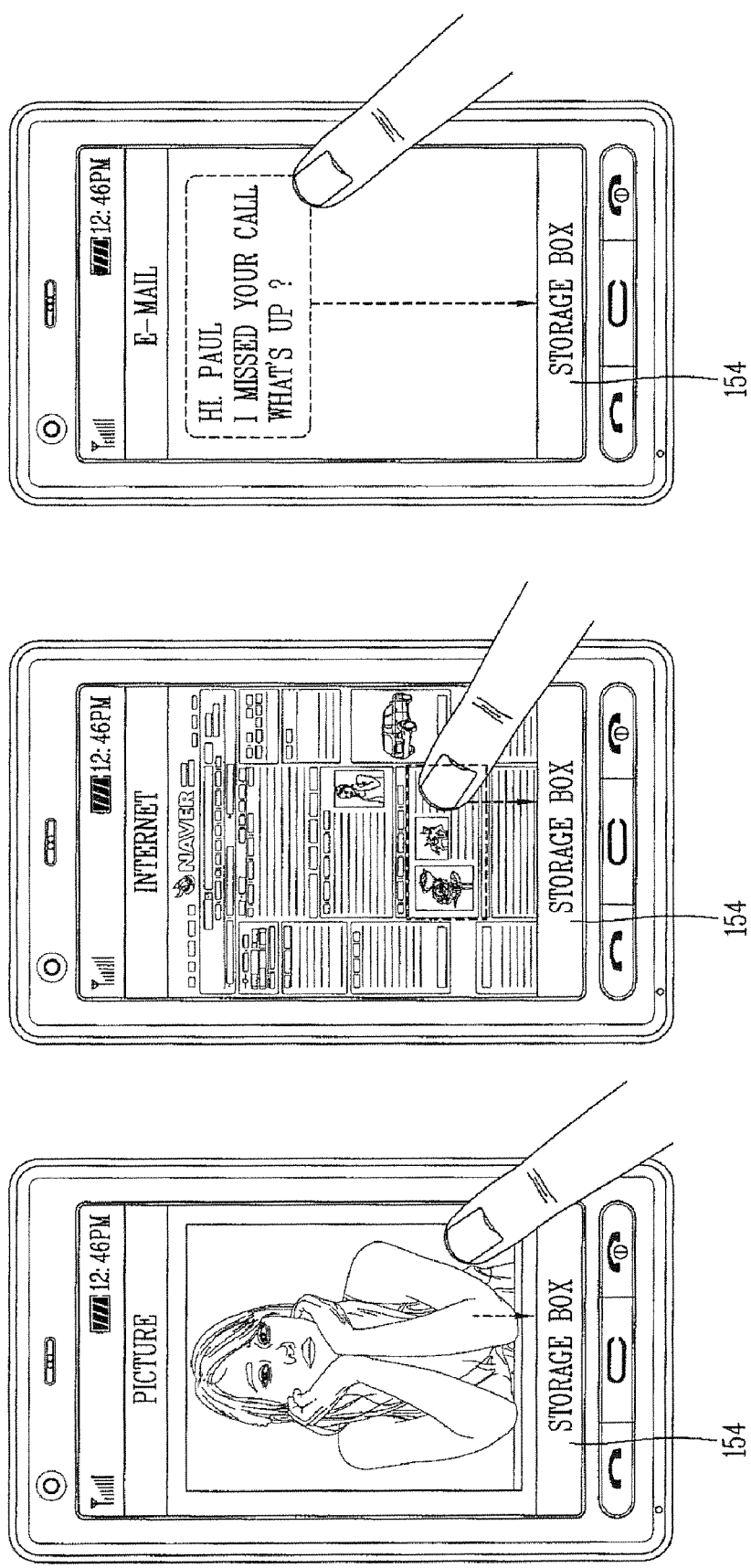
FIG. 7 illustrates an example of various contents stored in the storage box according to an embodiment of the present invention.

As illustrated in FIG. 7, the user may touch-and-drag a photo image, an Internet article, or e-mail content on the touch screen and store the selected content in the storage box 154. The stored contents may retain the original format, such as JPEG, BMP, or HTML, so that it may be used for an MMS, or an e-mail. However, the size of the stored content may change when stored in the storage box 10. Additionally, the number of content stored in the storage box 154 may be visually displayed on the storage box.

The location, shape, and size of the storage box 154 may be adjusted for user convenience. The touch-and-drag may include a closed-curved line form, such as, a circular shape, an oval shape, or a polygonal shape. As illustrated in FIG. 7, the touch-and-drag includes selecting an Internet article, e-mail content, or the simple movement of a photo image.

The storage box 154 may be selectively displayed when a specific input is received. For example, the storage box 154 may be displayed if a specific item is scrolled or a specific region is selected by the user. Additionally, the storage box 154 may be automatically displayed if the dragged contents are approached by a certain distance with a proximity touch. The storage box display settings may be set in an environment setting menu.

Figure 8:
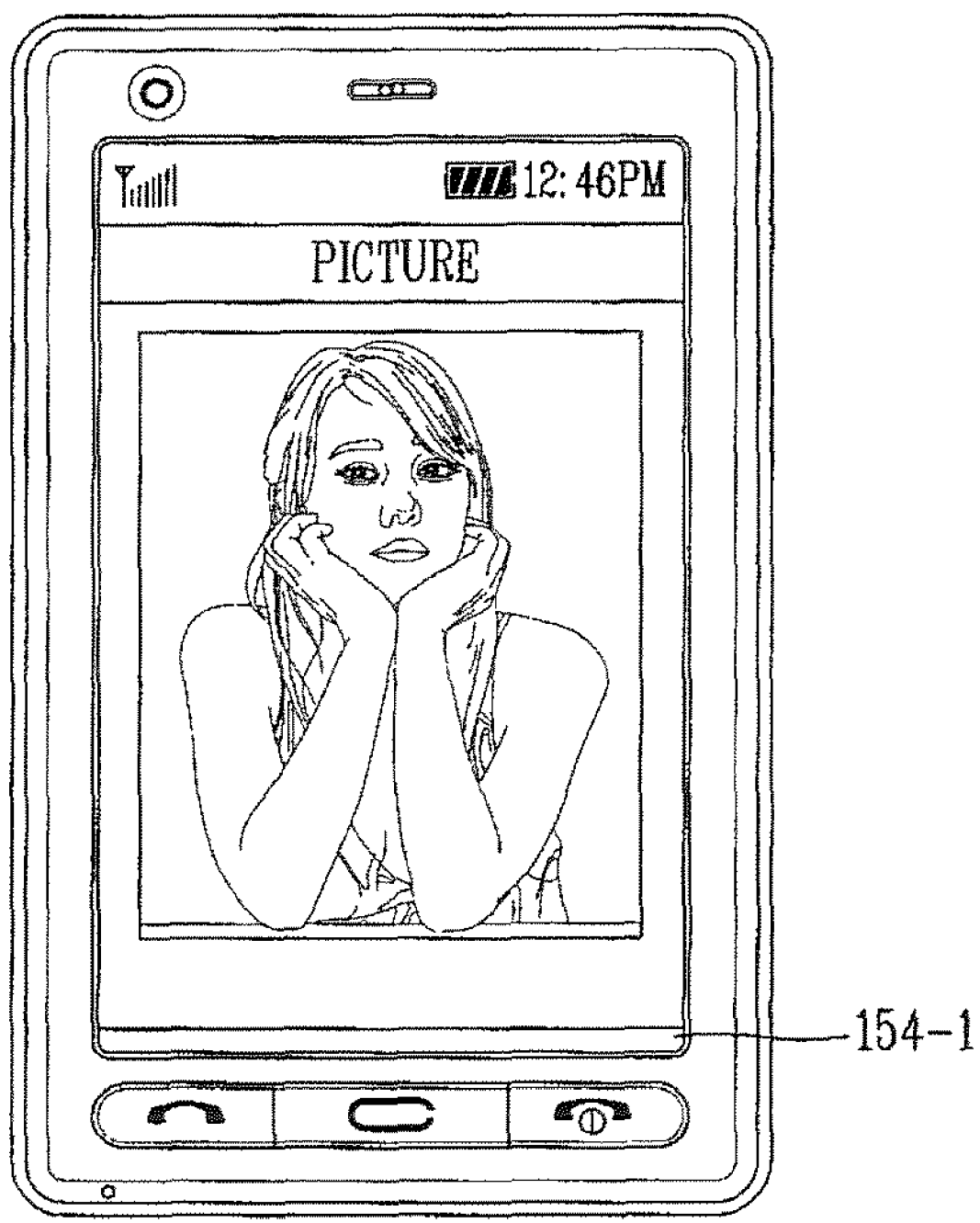
FIG. 8 illustrates another example of a storage box according to an embodiment of the present invention.

The storage box 154 may be displayed in a planar shape or a linear shape. FIG. 8 shows another example of a storage box according to an embodiment of the present invention.

Figure 9:
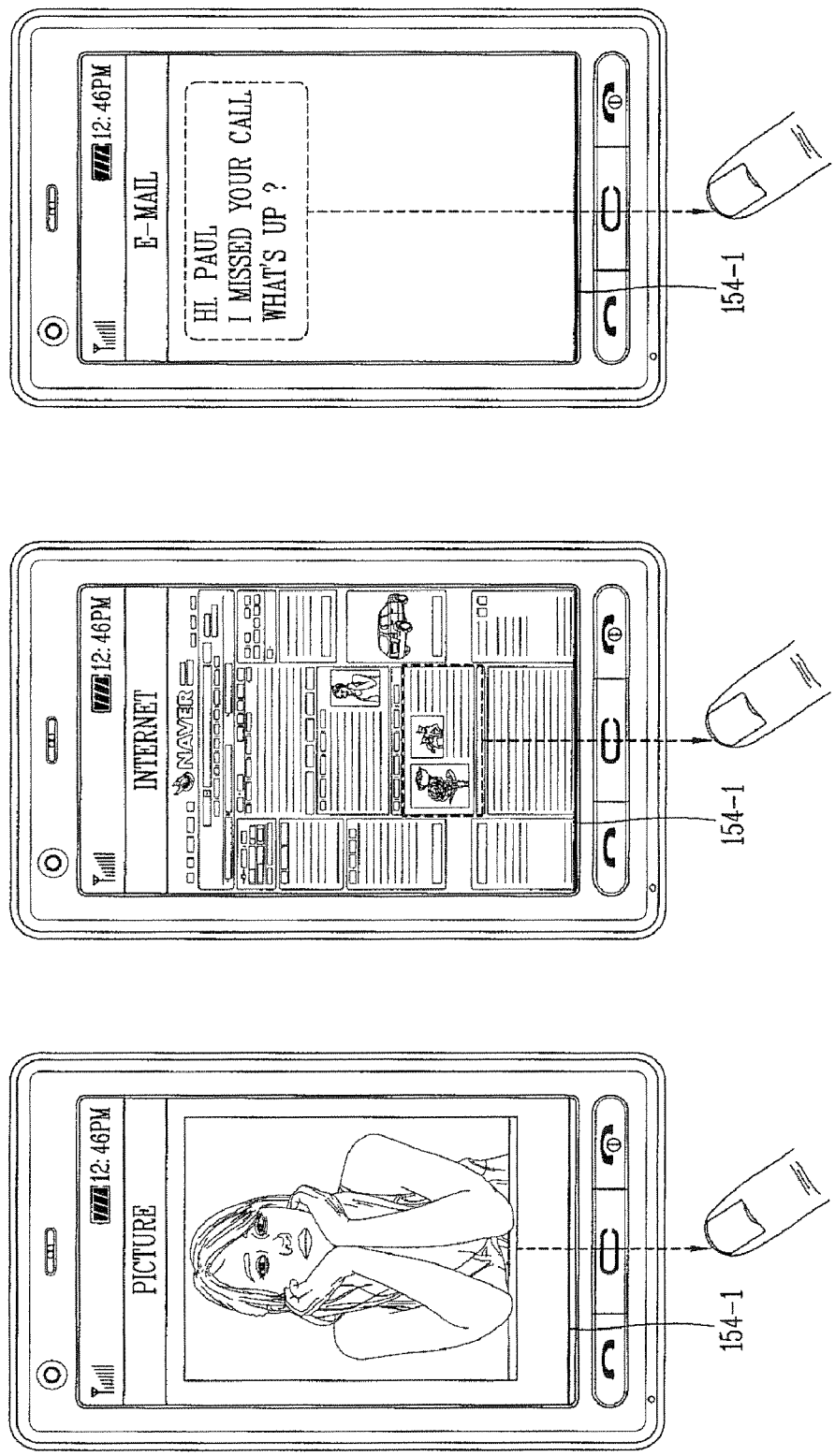
FIG. 9 illustrates an example of various contents stored in a different type of storage box 154 according to an embodiment of the present invention.
Figure 10:
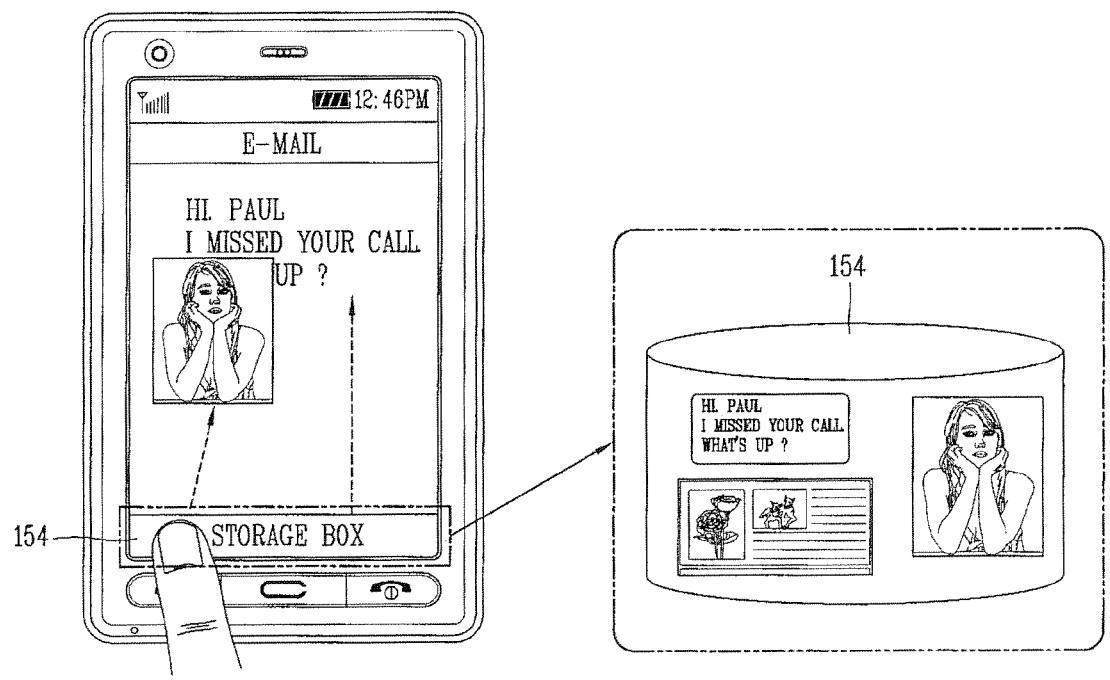
FIG. 10 illustrates an example of using various contents stored in the storage box by a different application according to an embodiment of the present invention.

As illustrated in FIG. 8, the storage method of the contents may differ if a storage box 154-1 is implemented in the linear form. Specifically, as illustrated in FIG. 9, the user may touch-and-drag content on a screen and store the selected contents by passing through the storage box 154-1 provided at the lower end portion of the display screen. As illustrated in FIG. 10, the content stored in the storage box 154 or the storage box 154-1 (not displayed) may be displayed if the storage box is selected via a touch or proximity touch.

Figure 11:
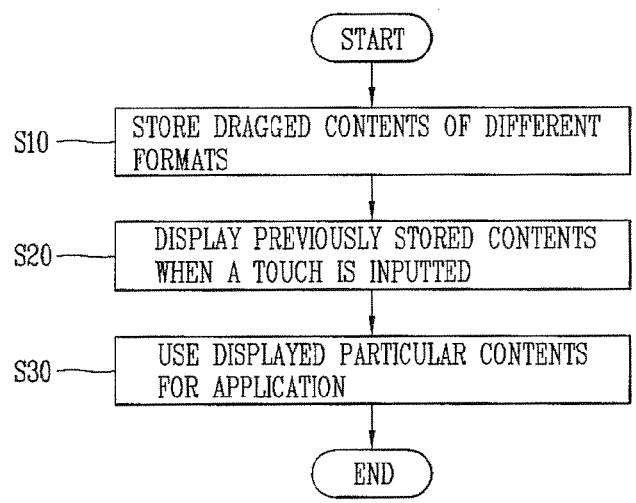
FIG. 11 illustrates a flow chart for a method of using a storage box of a mobile terminal according to an embodiment of the present invention.

FIG. 11 illustrates a flow chart for a method of using a storage box of a mobile terminal according to an exemplary embodiment of the present invention. As illustrated in FIG. 11, the user may touch-and-drag selected content to the storage box 154 or 20 and the controller 180 stores the dragged contents in the storage box 154 or 20 (S10). Additionally, multiple content formats may be stored in the storage box 154 or 20.

Thereafter, the controller 180 displays the stored contents in various discernible shapes on a certain region of the display unit 151 if the user touches the storage box 154 or 20 via a touch or proximity touch (S20). The user may select the content and create an e-mail or MMS (S30).

In the embodiments of the present invention, the above-described method may be implemented as codes that may be read by a computer in a program-recorded medium. The computer-readable medium includes various types of recording devices in which data read by a computer system is stored. The computer-readable medium may include a ROM, a RAM, a CD-ROM, a magnetic tape, a floppy disk, and an optical data storage device. The computer-readable medium also includes implementations in the form of carrier waves or signals, such as transmission via the Internet. The computer may include the controller 180 of the terminal.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal having a touch function, the mobile terminal comprising:
    a display configured to display a first content of a plurality of contents on a screen of the display and a storage area defined at a fixed position on the screen;
    a memory configured to store data; and
    a controller configured to;
        control displaying of the first content and the storage area on the display;
        capture a specific portion of the displayed first content in response to a received touch input to the specific portion of the displayed first content;
        control the memory to store the captured specific portion of the displayed first content in response to a received drag input of the captured specific portion of the displayed first content to the storage area, wherein the specific portion of the displayed first content is less than an entirety of the displayed first content and an original format of the captured specific portion of the displayed first content is retained when stored;
        control the display to stop displaying the first content while continuing to display the storage area;

control displaying of a second content of the plurality of contents while continuing to display the storage area, wherein the second content is different from the first content;

control displaying of the stored specific portion of the first content outside the displayed storage area and in the original format while continuing to display the second content in response to a touch input received on the storage area; and move the stored specific portion of the first content to the displayed second content in response to a received touch-and-drag input of the displayed stored specific portion of the first content to the displayed second content, wherein the storage area is displayed separate from all contents of the plurality of contents and is constantly displayed whenever any content of the plurality of contents is displayed on the screen.

2. The mobile terminal of claim 1, wherein the display comprises a touch screen.

3. The mobile terminal of claim 1, wherein the fixed position is at one end of the screen.

4. The mobile terminal of claim 3, wherein the one end is a lower end portion of the display unit.

5. The mobile terminal of claim 1, wherein the controller is further configured to control displaying of a number of contents or specific content portions stored in the memory on the displayed storage area.

6. The mobile terminal of claim 1, wherein the storage area has a linear shape.

7. The method of claim 1, wherein the specific portion of the first content comprises a photo image, a schedule, text, website information, content information, a map, or e-mail information.

8. A method for storing information in a mobile terminal having a touch function, the method comprising:

controlling displaying, via a contoller of the mobile terminal, of a first content of a plurality of contents on a screen of a display of the mobile terminal;

controlling displaying, via the controller, of a storage area defined at a fixed position on the screen;

detecting a received touch input, via the controller, to specific portion of the displayed first content;

capturing the specific portion of the displayed first content, via the controller, in response to the detected received touch input to the specific portion of the displayed first content;

detecting, via the controller, a received drag input of the captured specific portion of the displayed first content to the displayed storage area;

controlling a memory of the mobile terminal, via the controller, to store the captured specific portion of the displayed first content, wherein the specific portion of the displayed first content is less than an entirety of the displayed first content and an original format of the captured specific portion of the displayed first content is retained when stored;

controlling stopping of the displaying of the first content, via the controller, while continuing the displaying of the storage area;

controlling displaying of a second content of the plurality of contents, via the controller, while continuing to display the storage area, wherein the second content is different from the first content;

detecting a received touch input, via the controller, to the storage area;

controlling displaying of the stored specific portion of the first content outside the displayed storage area and in the original format while continuing controlling of the displaying of the second content in response to the detected received touch input to the storage area;

detecting, via the controller, a received touch-and-drag input of the displayed stored specific portion of the first content to the displayed second content; and controlling the display, via the controller, to move the resized stored captured specific content item to the second content in response to the detected touch-and-drag input of the of the displayed stored specific portion of the first content, wherein the storage area is displayed separate from all contents of the plurality of contents and is constantly displayed whenever any content of the plurality of contents is displayed on the screen.

9. The method of claim 8, wherein the specific portion of the first content comprises a picture, a schedule, text, website information, content information, a map, or e-mail information.

10. The method of claim 8, wherein the storage area is located at a lower end region of the screen.

11. The method of claim 8, wherein the storage area comprises a linear shape.

12. The method of claim 8, further comprising controlling the display, via the controller, to display a number of contents or specific content portions stored in the memory on the displayed storage area.

* * * * *